US005913559A

United States Patent [19]

Sexton et al.

[11] Patent Number: 5,913,559

[45] Date of Patent: Jun. 22, 1999

[54] FASTENING TRACK, COT TRANSPORT VEHICLE ADAPTED TO SECURE THE FASTENING TRACK, AND COT FASTENING SYSTEM INCORPORATING SAME

[75] Inventors: Gregory J. Sexton, Beavercreek; Jerry Taylor, Greenfield; Richard C. Habermehl, Jr., New Vienna, all of Ohio

[73] Assignee: Ferno-Washington, Inc., Wilmington, Ohio

[21] Appl. No.: 08/820,118

[22] Filed: Mar. 19, 1997

[51] Int. Cl.[6] .......... B60P 7/08

[52] U.S. Cl. .......... 296/20; 410/7; 410/66; 410/69; 410/77; 5/511

[58] Field of Search .......... 410/3, 4, 7, 8, 410/9, 19, 22, 66, 69, 77, 80; 296/18, 19, 20, 65.04; 5/118, 511, 110; 248/500, 503, 503.1; 16/96 R

[56] References Cited

U.S. PATENT DOCUMENTS

| | | | |
|---|---|---|---|
| 3,785,601 | 1/1974 | Kitchen, Jr. et al. | 410/7 |
| 3,866,542 | 2/1975 | Blunden | 410/8 |
| 3,918,554 | 11/1975 | Bourgraf et al. | 296/19 X |
| 4,115,884 | 9/1978 | Kedgh | 296/19 X |
| 4,496,271 | 1/1985 | Spinosa et al. | 410/8 X |
| 5,092,722 | 3/1992 | Reazer, III et al. | 410/104 |
| 5,183,313 | 2/1993 | Cunningham | 410/105 X |
| 5,205,601 | 4/1993 | Ferris | 296/20 |
| 5,494,386 | 2/1996 | Paull | 410/77 |
| 5,599,035 | 2/1997 | Spence | 410/77 X |

FOREIGN PATENT DOCUMENTS

| | | | |
|---|---|---|---|
| 3248056 | 6/1984 | Germany | 248/503.1 |
| 2281201 | 3/1995 | United Kingdom | 296/20 |

*Primary Examiner*—Stephen T. Gordon

*Attorney, Agent, or Firm*—Killworth, Gottman, Hagan & Schaeff, L.L.P.

[57] ABSTRACT

A fastening track, a cot transport vehicle adapted to securely receive the fastening track, and a cot fastening system incorporating the cot fastening track are provided. At least two track securing members extend from the lower surface of the fastening track and are received in a self-centering aperture of a mounting assembly provided within a support surface of a transport vehicle. The fastening track comprises a frame including a spanner which is resistant to thermal expansion. A locking mechanism is provided including a convenient a latch disengagement member. The fastening track also includes a track clamping mechanism comprising a safety flag movable between a secured position and an unsecured position. The safety flag prevents inadvertent disengagement of the track from the vehicle and improper loading of a cot onto the vehicle. A stop cam is provided on the track to prevent inadvertent unloading of the cot from the track. A cot-mounted data port and a track-mounted data port comprise mating data connections to allow convenient transfer of data from a data transfer device mounted on the cot. An array of indicator lights oriented substantially parallel to the longitudinal body and the entry portion are provided to guide cot loading.

18 Claims, 11 Drawing Sheets

FASTENING TRACK, COT TRANSPORT VEHICLE ADAPTED TO SECURE THE FASTENING TRACK, AND COT FASTENING SYSTEM INCORPORATING SAME

BACKGROUND OF THE INVENTION

The present invention relates to the secure transport of cots, i.e., stretchers, carts, incubator transporters, and other similar patient transfer devices. More particularly, the present invention relates to a fastening track, a cot transport vehicle adapted to securely receive the fastening track of the present invention, and a cot fastening system incorporating the cot fastening track of the present invention wherein unnecessary cot movement during transport is prevented, cot movement in the event of a vehicular crash is inhibited, easy removal and installation of the fastening track within the vehicle and of the cot within the track is provided, and cot loading and unloading safety is enhanced.

In ambulances and other emergency rescue vehicles, removable cots or stretchers are often provided for convenient and comfortable patient transport from a remote accident site to the vehicle. These devices commonly include a lightweight structural frame or chassis to provide support for the patient with wheels, casters or other rolling mechanisms attached thereto. Once the patient is rolled to the emergency vehicle on the cot, the chassis undercarriage may be collapsed and folded to facilitate insertion of the device into the emergency vehicle. The device is then rolled into the emergency vehicle and fastened into position for safe transportation.

A cot fastener system comprising a front member often referred to as an "antler" bracket, and a rear fastening rail has been widely used in the industry for a number of years. Particularly, the front bracket generally includes a pair of upwardly extending hook-like members which curve to the rear of the emergency vehicle and are designed to receive and effectively hook onto portions of the forward support frame members of the cot. This bracket thereby limits forward movement of the cot within the emergency vehicle. A separate rear fastening rail is thereafter secured to the cot frame to secure the cot against further rolling movement within the emergency vehicle.

Consequently, while there have been available cot fastener systems utilized in the industry, there has heretofore not been available a fastener system which provides for easy removal and installation of the fastening system within the vehicle and of the cot within the track. Finally, there has heretofore not been available a fastener system on which provides for enhanced cot loading and unloading safety.

BRIEF SUMMARY OF THE INVENTION

These needs are met by the present invention wherein a fastening track, a cot transport vehicle adapted to securely receive the fastening track, and a cot fastening system incorporating the cot fastening track are provided wherein unnecessary cot movement during transport is prevented, easy removal and installation of the fastening track within the vehicle and of the cot within the track is provided, and cot loading and unloading safety is enhanced.

In accordance with one embodiment of the present invention, a fastening track is provided comprising a frame defining a first end, a second end, a longitudinal body extending from the first end to the second end. The longitudinal body defines an upper track surface and a lower track surface. An entry portion is positioned proximate the first end and an abutment portion is positioned along the longitudinal body between the entry portion and the second end. A locking mechanism is positioned along the longitudinal body and at least two track securing members extend from the lower track surface. Each of the track securing members comprise an extension portion secured to the frame and a lateral projection extending beyond a periphery of the extension portion. The extension portion preferably comprises a substantially cylindrical shaft and the lateral projection preferably defines a substantially circular periphery.

The frame preferably comprises a shell defining a pair of longitudinal cavities positioned on opposite sides of the longitudinal body, and a spanner positioned within each of the pair of longitudinal cavities and extending substantially the entire length of the longitudinal cavity. The spanner is formed of a material which exhibits insignificant thermal expansion relative to the shell at temperatures ranging from about −40° F. to about 140° F. (about −40° C. to about 60° C.).

In accordance with another embodiment of the present invention, a cot transport vehicle is provided comprising a substantially planar support surface including at least one mounting assembly recess formed therein and a mounting assembly positioned in the mounting assembly recess. The mounting assembly comprises a mounting cavity formed in the mounting assembly body and a centering aperture formed in the upper surface of the body over at least a portion of the mounting cavity. The centering aperture converges from a greater aperture dimension to a lesser aperture dimension and defines a converging mounting path extending from the front end to the rear end and a mounting lip formed over at least a portion of the mounting cavity. The mounting assembly may define a plurality of substantially parallel mounting axes.

The mounting cavity preferably includes a mounting ramp formed therein. The mounting ramp defines a declining surface extending along at least a portion of the mounting path. A clamping aperture may be formed in the upper surface of the body.

The cot transport vehicle may further comprise a fastening track comprising a frame, an entry portion, an abutment portion, a locking mechanism, and at least two track securing members extending from the lower track surface. Each of the track securing members comprises an extension portion secured to the frame and a lateral projection extending beyond a periphery of the extension portion. The lateral projection defines a projection dimension which is greater than the lesser aperture dimension and lesser than the greater aperture dimension. The extension portion may comprise a shaft and the lateral projection may define a substantially circular cross section.

In accordance with yet another embodiment of the present invention, a fastening track is provided comprising a frame, an entry portion, an abutment portion, and a locking mechanism defining a locking position offset from the loading passage. The locking mechanism comprises a cot guide latch positioned to extend into the locking position and a latch disengagement member coupled to the cot guide latch and positioned adjacent an exterior surface of the longitudinal body.

The locking mechanism may further comprise an electrical switching assembly, the switching assembly including a switch trigger positioned to extend into the locking position. The latch disengagement member may include a mobile finger grip portion and the entry portion may define a stationary grip surface aligned with the mobile finger grip portion.

The fastening track may further comprise an intermediate abutment portion and at least one intermediate mounting plate positioned along the longitudinal body between the abutment portion and the entry portion. The intermediate mounting plate and the intermediate abutment portion may define an attachment assembly operative to mechanically couple the intermediate abutment portion to the intermediate mounting plate.

In accordance with yet another embodiment of the present invention, a fastening track is provided comprising a frame, an entry portion, an abutment portion, a locking mechanism, and a track clamping mechanism. The track clamping mechanism comprises a safety flag movable between a secured position and an unsecured position, and a clamp coupled to the safety flag, the clamp including a catch portion.

The longitudinal body preferably defines a loading passage extending from the entry portion to the abutment portion and the unsecured position is characterized by intersection of the loading passage by the safety flag. The secured position is preferably characterized by non-intersection of the loading passage by the safety flag.

In accordance with yet another embodiment of the present invention, a fastening track is provided comprising a frame, an entry portion, an abutment portion, a locking mechanism, and a stop cam positioned along the longitudinal body and extending from the upper track surface in an extended position. The stop cam includes a camming surface and a mechanical stop surface and is oriented such that the camming surface is generally disposed in the direction of the first end and the mechanical stop surface is generally disposed in the direction of the second end. The stop cam is preferably spring loaded so as to be movable under compression out of the extended position towards a retracted cam position.

In accordance with yet another embodiment of the present invention, a cot fastening system is provided comprising a fastening track is provided comprising a frame, an entry portion, an abutment portion, a locking mechanism, a track clamping mechanism, and a cot. The track clamping mechanism comprises a safety flag movable between a secured position and an unsecured position, and a clamp coupled to the safety flag, the clamp including a catch portion. The cot comprises a chassis, a loading cot guide secured to the chassis, and a trailing cot guide secured to the chassis.

The safety flag is preferably arranged to inhibit passage of the loading cot guide past the safety flag in the unsecured position and to permit passage of the loading cot guide past the safety flag in the secured position. The locking mechanism may define a locking position such that, where the trailing cot guide is positioned in the locking position, movement of the safety flag to the unsecured position is inhibited.

In accordance with yet another embodiment of the present invention, a cot fastening system is provided comprising a fastening track comprising a frame, an entry portion, an abutment portion, a locking mechanism positioned along the longitudinal body, a stop cam extending from the upper track surface, and a cot. The stop cam includes a camming surface and a mechanical stop surface and is oriented such that the camming surface is generally disposed in the direction of the first end and the mechanical stop surface is generally disposed in the direction of the second end. The cot comprises a chassis, a loading cot guide secured to the chassis, a trailing cot guide secured to the chassis, and a stop cam release mechanism secured to the chassis. The stop cam release mechanism may comprise a hand grip and a release lever coupled to the chassis. The release lever may be positioned to engage the stop cam.

In accordance with yet another embodiment of the present invention, a cot fastening system comprising a cot including a data transmission device mounted thereto, the data transmission device including a cot-mounted data port, and a cot fastening track. The cot fastening track comprises a frame, a cot entry portion, a cot abutment portion, a cot locking mechanism, and a track-mounted data port positioned so as to enable transfer of is data between the cot-mounted data port and the track-mounted data port.

The track-mounted data port is preferably positioned so as to enable transfer of data between the cot-mounted data port and the track-mounted data port subsequent to passage of a portion of the cot through the cot entry portion of the cot fastening track. The data transmission device may comprise a personal computer or a data link.

In accordance with yet another embodiment of the present invention, a fastening track is provided comprising a frame, a cot entry portion, a cot abutment portion, a cot locking mechanism, and an array of indicator lights oriented substantially parallel to one of the longitudinal body and the entry portion. The array of indicator lights may be positioned along the upper track surface. Further, the entry portion may define a converging entry path and the array of indicator lights may define a converging path of illumination positioned along the entry portion.

In accordance with yet another embodiment of the present invention, a fastening track is provided comprising a frame, a cot entry portion, a cot abutment portion, a cot locking mechanism, and first and second subsets of indicator lights and a switching mechanism arranged so as to selectively energize the first subset of indicator lights and the second subset of indicator lights in response to engagement of the locking mechanism. The entry portion may define a converging entry path and at least one of the first subset of lights and the second subset of lights may define a converging path of illumination positioned along the entry portion. The first subset of lights may indicate disengagement of the locking mechanism and the second subset of lights may indicate engagement of the locking mechanism.

In accordance with yet another embodiment of the present invention, a cot is provided comprising: a chassis defining a loading end and a trailing end; loading wheels supported by respective loading wheel hubs, the loading wheel hubs being coupled to the loading end of the chassis; and a support member mechanically coupled to the chassis, the support member including a cot guide portion substantially aligned with an axis of rotation of the loading wheels. The support member is preferably mechanically coupled between the loading wheel hubs.

Accordingly, it is an object of the present invention to provide a fastening track, a cot transport vehicle adapted to securely receive the fastening track, and a cot fastening system incorporating the cot fastening track, wherein unnecessary cot movement during transport is prevented, easy removal and installation of the fastening track within the vehicle and of the cot within the track is provided, and cot loading and unloading safety is enhanced.

DETAILED DESCRIPTION OF THE INVENTION

Figure 1:
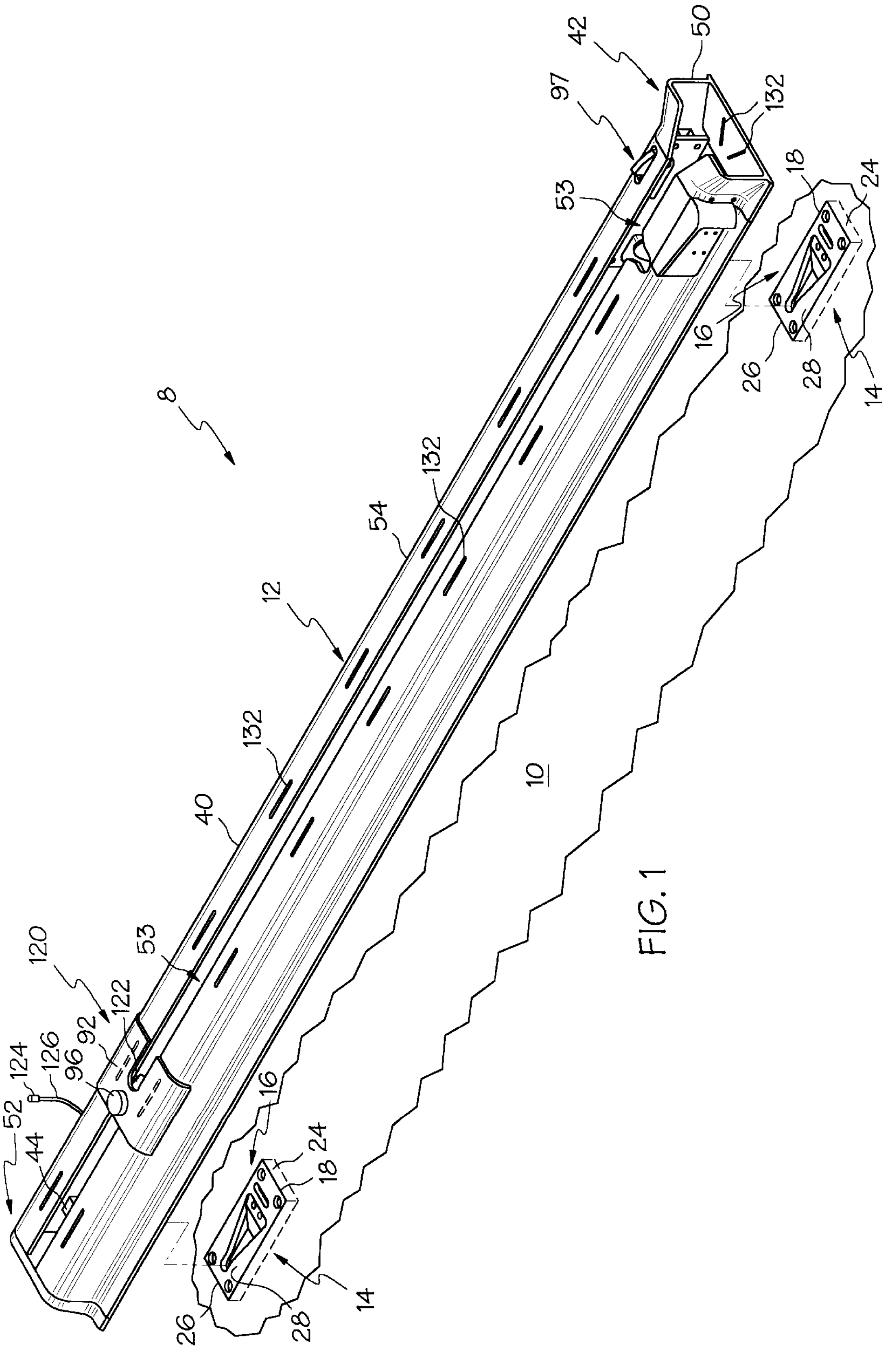
FIG. 1 is an isometric view, partially broken away, of a cot transport vehicle according to the present invention.

The present invention is described in detail herein with reference to the illustrative embodiments of FIGS. 1–10, where like reference numerals are indicative of like structural elements.

According to the present invention, as illustrated In FIG. 1, a cot transport vehicle 8 including a substantially planar support surface 10 is adapted to securely receive a fastening track 12 thereon. The structure of the fastening track 12 is described in further detail below with reference to FIGS. 5–10. The cot transport vehicle 8 typically comprises an ambulance or another emergency rescue vehicle; however, for the purpose of defining the present invention, the cot transport vehicle 8 may comprise any support structure subject to motion.

Figure 2A:
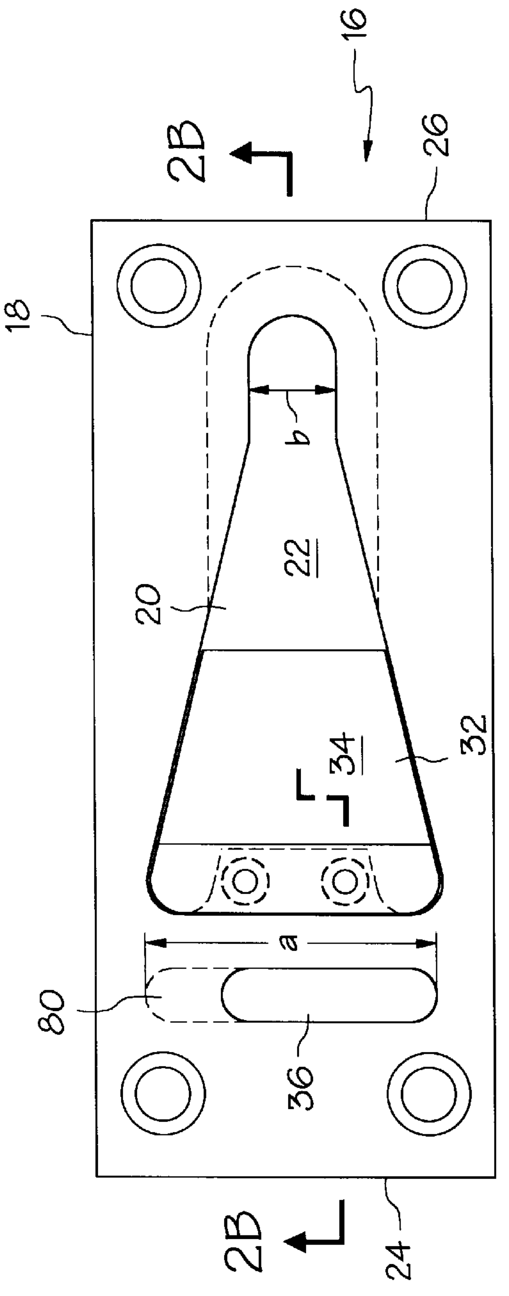
FIG. 2A is a top view of a mounting assembly according to the present invention.
Figure 2B:
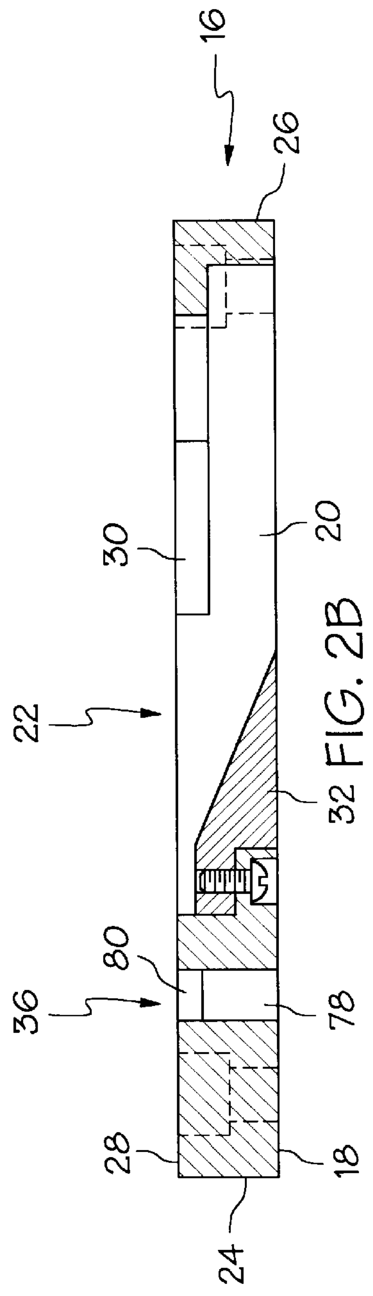
FIG. 2B is a cross sectional view of the mounting assembly of FIG. 2A taken along line 2B—2B.

Referring now to FIGS. 1, 2A, and 2B, the substantially planar support surface 10 includes a pair of mounting assembly recesses 14 formed therein. A mounting assembly 16 is positioned in each recess 14. The mounting assembly 16 comprises respective mounting assembly bodies 18, mounting cavities 20, and centering apertures 22. Each mounting assembly body 18 defines a front end 24, a rear end 26, and a substantially planar upper surface 28 extending from the front end 24 to the rear end 26. The mounting cavity 20 is formed in the mounting assembly body 18. The centering aperture 22 is formed in the upper surface 28 over at least a portion of the mounting cavity 20. The centering aperture 22 defines a converging mounting path extending from the front end 24 to the rear end 26 such that the centering aperture 22 converges from a greater aperture dimension a to a lesser aperture dimension b. Further, the centering aperture 22 defines a mounting lip 30 formed over at least a portion of the mounting cavity 20 so as to border at least a portion of the centering aperture 22. A lower clamping aperture 36, the function of which is described in detail below with respect to FIGS. 6–9, is formed in the upper surface 28.

The mounting cavity 20 includes a mounting ramp 32 formed therein. The mounting ramp may comprise a rigid plastic insert and defines a declining surface 34 extending along at least a portion of the converging mounting path defined by the centering aperture 22.

The mounting assembly recess 14 and the mounting assembly body 18 are sized and arranged such that the substantially planar support surface 10 and the substantially planar upper surface 28 form a single substantially continuous planar surface. Further, the assembly recesses 14 and the assembly bodies are positioned such that they define a mounting axis which is substantially parallel to a vehicle compartment enclosing the planar support surface 10. In addition, it is contemplated by the present invention that, a plurality of substantially parallel mounting axes may be provided on the support surface 10 so as to permit selective installation of the fastening track 12 along any one of a plurality of mounting axes within the vehicle compartment.

Referring now to FIGS. 1 and 5–10, the fastening track 12 is described in detail. The fastening track 12 comprises a frame 40, an entry portion 42, an abutment portion 44, a locking mechanism 46, see FIGS. 8B and 8C, and at least two track securing members 48, see FIGS. 7D and 7E, all of which are preferably adapted to provide a secure cot mounting arrangement. The frame 40 defines a first end 50, a second end 52, a loading passage 53, and a longitudinal body 54 extending from the first end 50 to the second end 52. The longitudinal body 54 defines an upper track surface 56 and a lower track surface 58. The entry portion 42 is positioned proximate the first end 50. The abutment portion 44 is positioned along the longitudinal body 54 between the entry portion 42 and the second end 52.

Figure 7A:
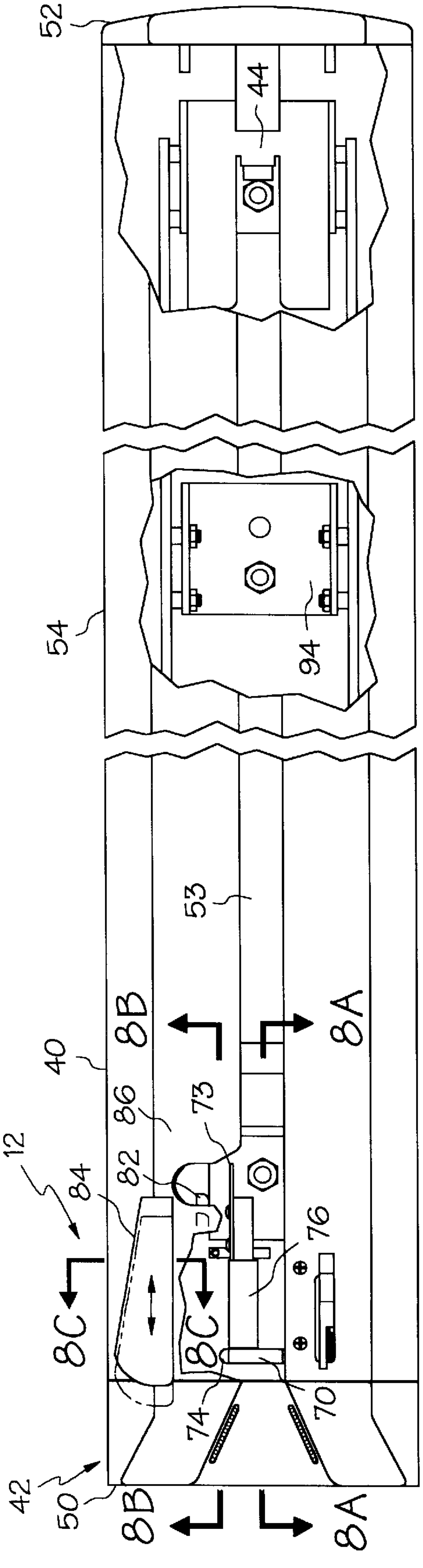
FIGS. 7A, 7B, 7C, 7D, and 7E, are top, left, right, rear, and front plan views, respectively, of a fastening track according to the present invention.
Figure 7C:
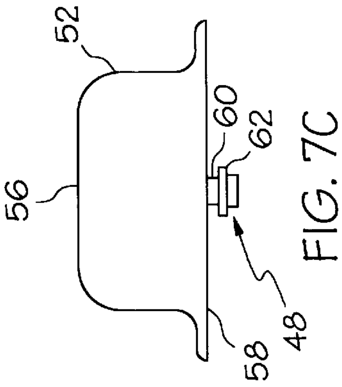
Figure 7B:
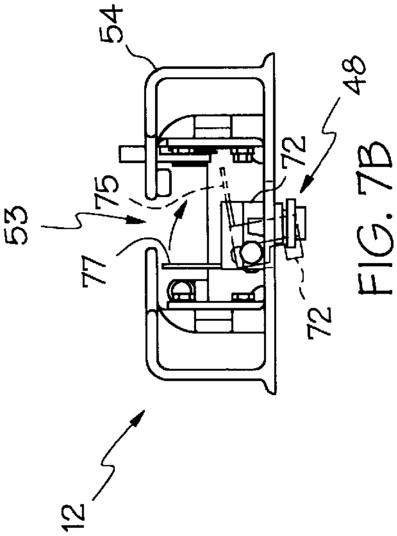
Figure 7D:
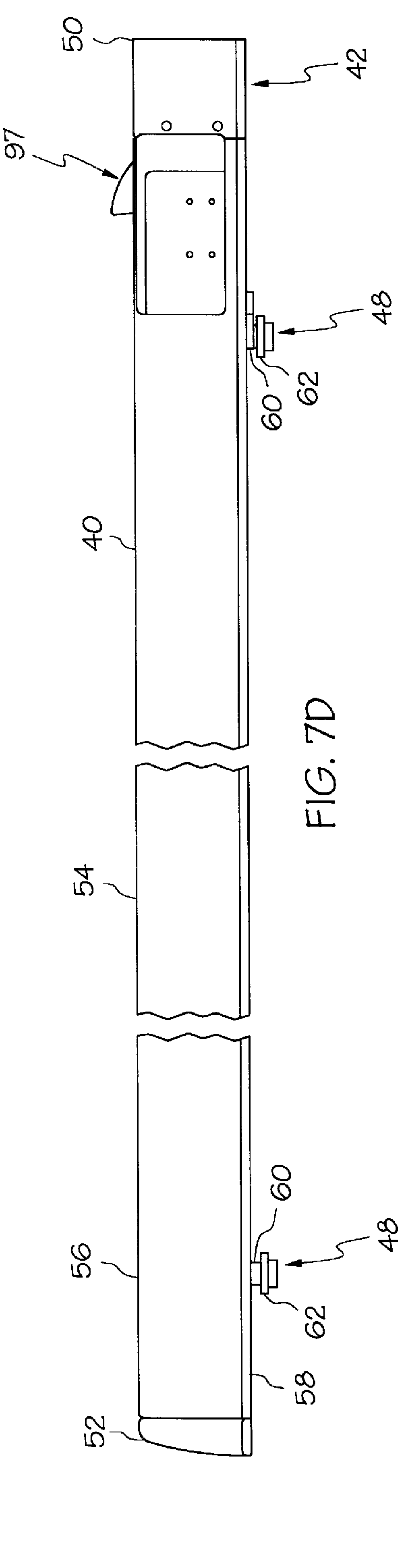
Figure 7E:
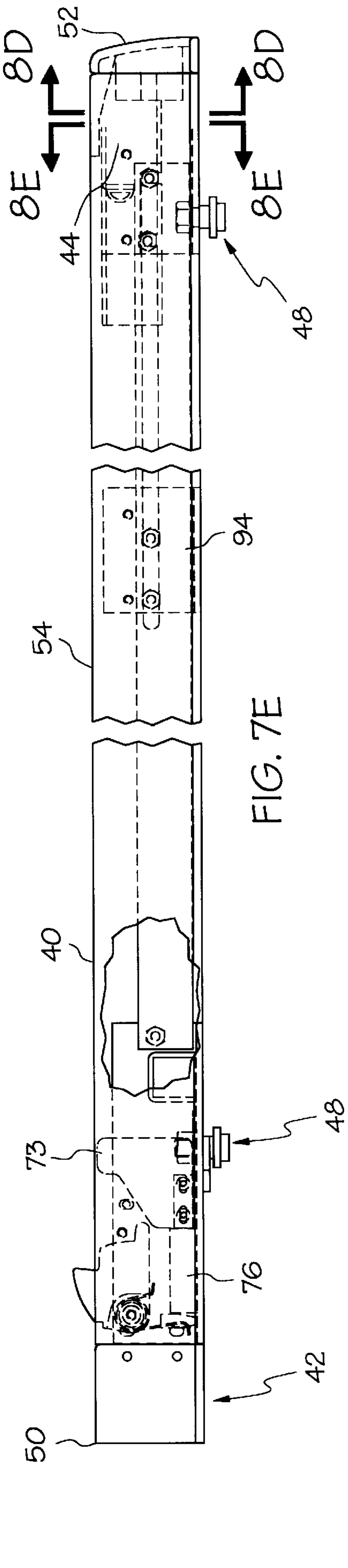

An intermediate abutment portion 92 and at least one intermediate mounting plate 94, see FIGS. 1, 7A, and 7E, are positioned along the longitudinal body 54 between the abutment portion 44 and the entry portion 42 in order to accommodate for varying cot lengths. The intermediate mounting plate 94 and the intermediate abutment portion 92 define an attachment assembly 96, e.g., a threaded bolt and a corresponding threaded bore, operative to mechanically couple the intermediate abutment portion 92 to the intermediate mounting plate 94.

Figure 8A:
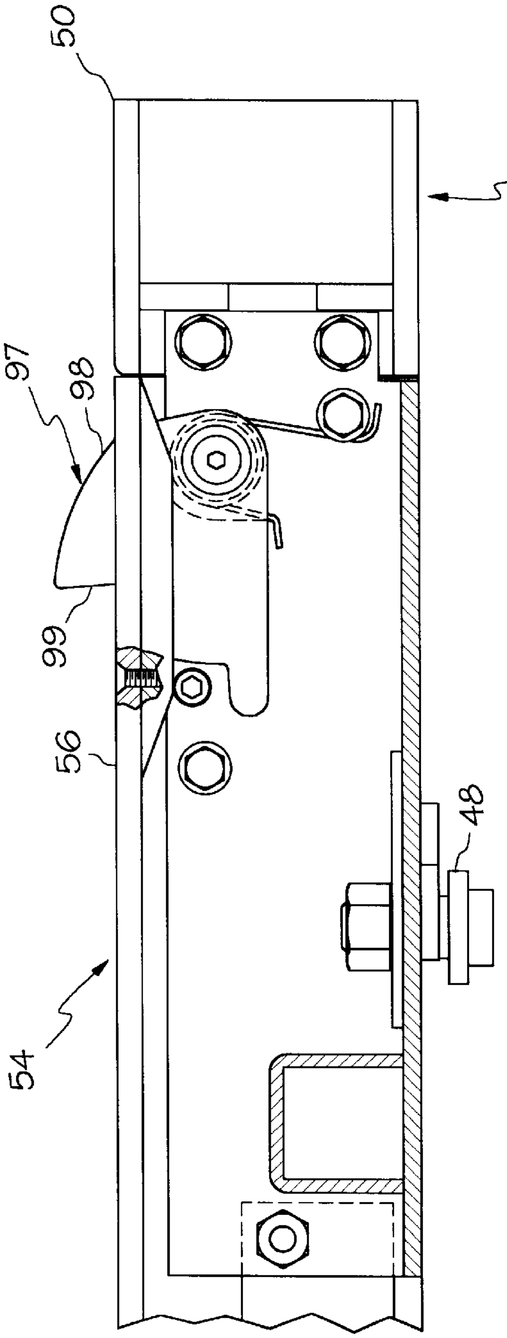
FIG. 8A is a plan view, partially in cross section and partially broken away, of the fastening track of FIG. 7A, taken along line 8A—8A.
Figure 8B:
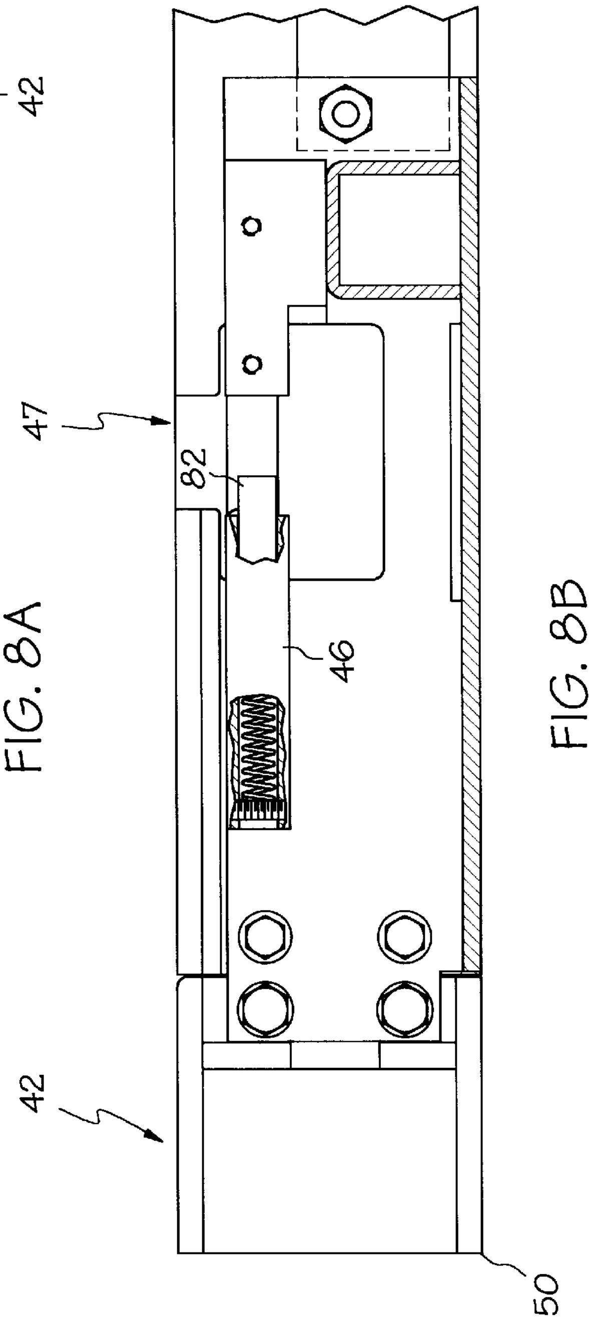
FIG. 8B is a plan view, partially in cross section and partially broken away, of the fastening track of FIG. 7A, taken along line 8B—8B.
Figure 8D:
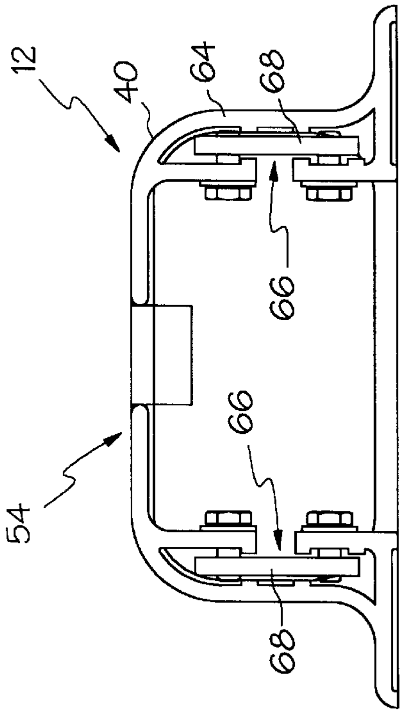
FIG. 8D is a plan view, partially in cross section and partially broken away, of the fastening track of FIG. 7E, taken along line 8D—8D.
Figure 8C:
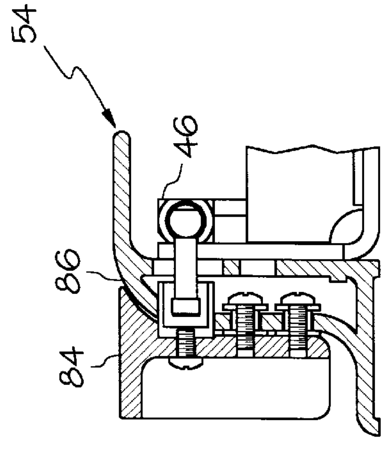
FIG. 8C is a plan view, partially in cross section and partially broken away, of the fastening track of FIG. 7A, taken along line 8C—8C.
Figure 8E:
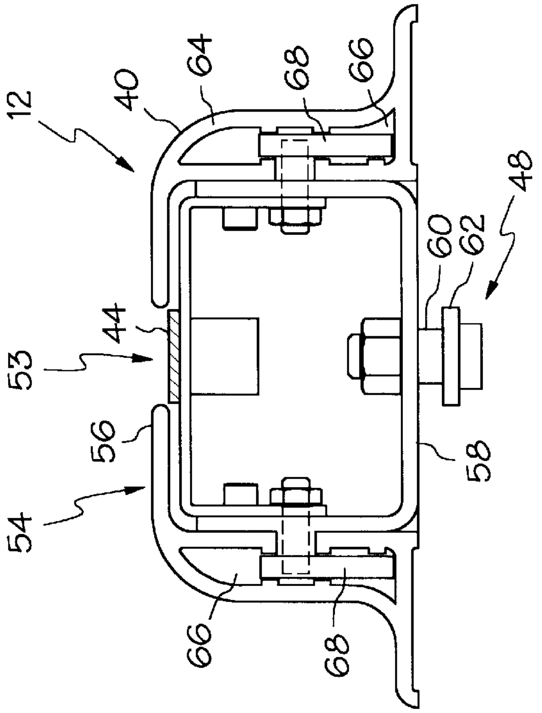
FIG. 8E is a plan view, partially in cross section and partially broken away, of the fastening track of FIG. 7E, taken along line 8E–8E.
Figure 10:
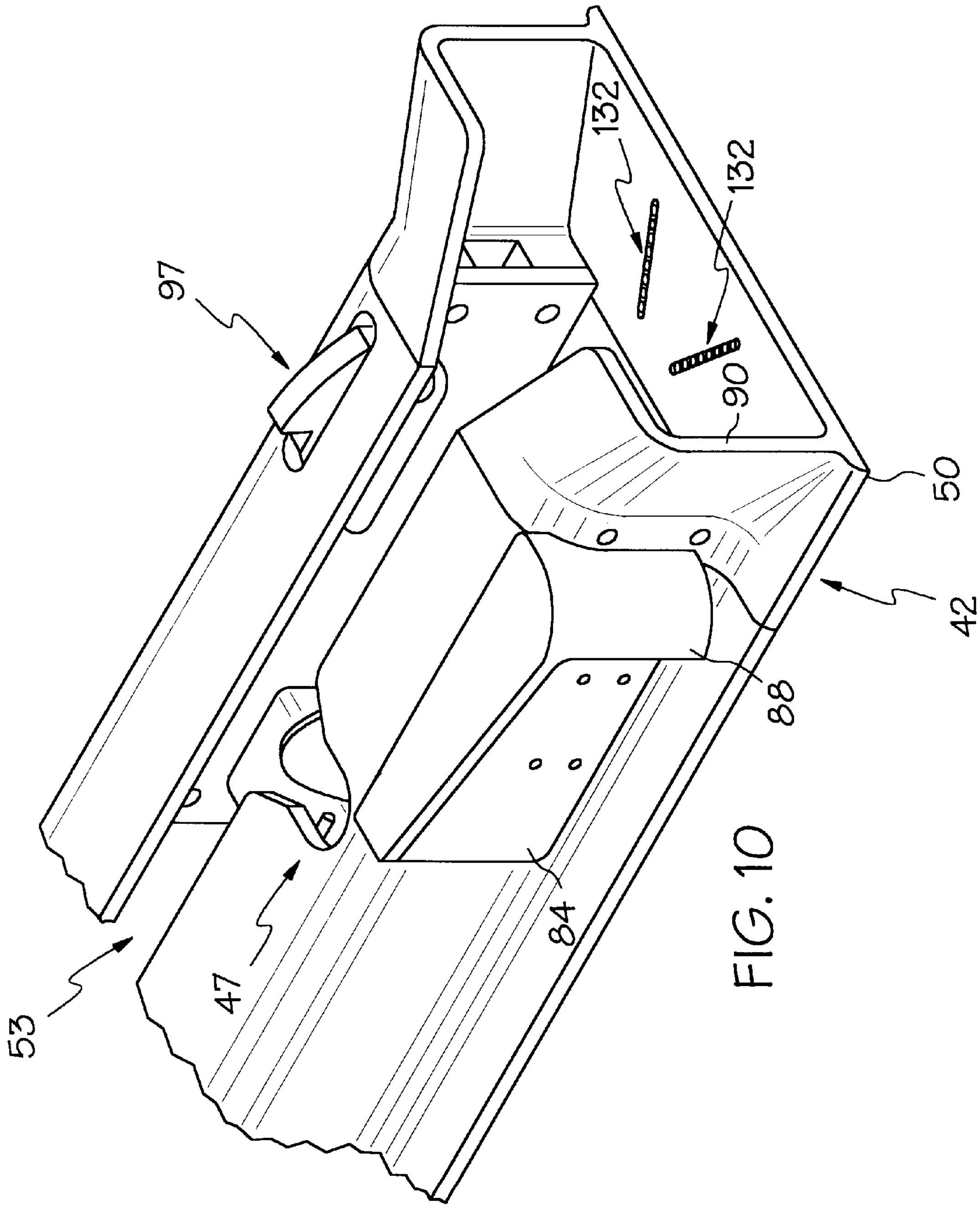
FIG. 10 is an isometric view, partially broken away, of a fastening track according to the present invention.

Referring now to FIGS. 8D and 8E, the frame 40 of the fastening track 12 comprises a shell 64 made of plastic or other durable material suitable for use in the present invention. The shell 64 defines a pair of longitudinal cavities 66 positioned on opposite sides of the longitudinal body 54. Separate spanner elements 68, which may comprise respective single pieces of material or multiple pieces of material coupled together along the length of the body 54, are positioned within each of the pair of longitudinal cavities 66 and extend substantially the entire length of the longitudinal cavity 66. The spanner elements 68 are formed of a material, e.g. aluminum, which exhibits insignificant thermal expansion relative to the shell at temperatures ranging from about −40° F. to about 140° F. (about −40° C. to about 60° C.). The track securing members 48 are mechanically coupled to the spanners 68, as opposed to the shell 64. In this manner, the track 12 remains securely fixed to the support surface 10 throughout the noted temperature range, even where the overall length of the shell 64 changes as a result of temperature changes.

The locking mechanism 46 is positioned along the longitudinal body 54 between the entry portion 42 and the abutment portion 44 and defines a locking position 47 offset from the loading passage 53. An electrical switching assembly including a switch trigger 88 extending into the locking position 47 is employed to provide a signal indicative of whether a cot guide or other structural member is present in the locking position 47, see FIG. 5.

Figure 5:
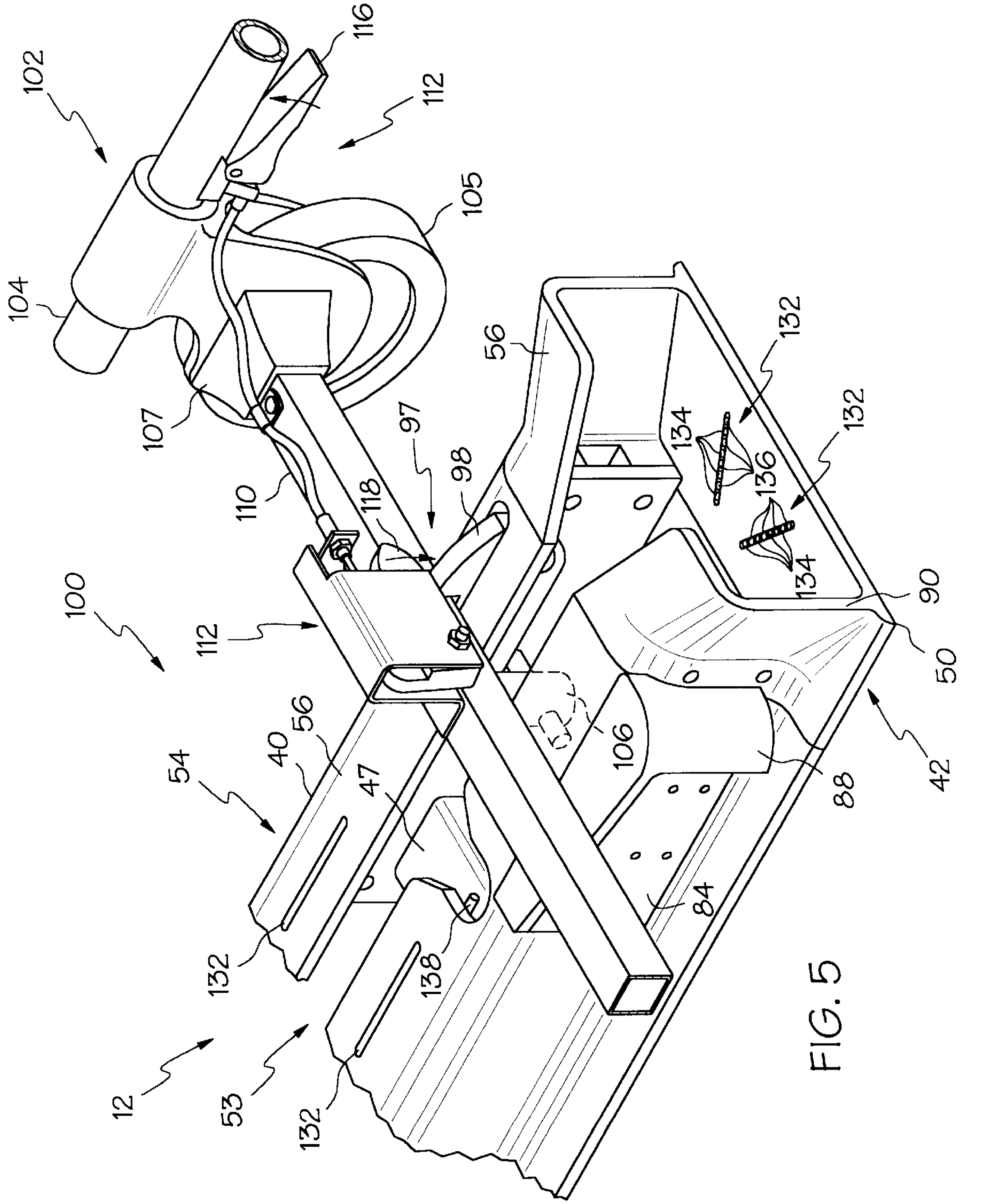
FIG. 5 is an isometric view, partially broken away of a cot fastening system according to the present invention.

The locking mechanism 46 comprises a spring loaded cot guide latch 82 positioned to extend into the locking position 47 and a latch disengagement member 84 coupled to the cot guide latch 82 and positioned adjacent an exterior surface 86 of the longitudinal body 54, see FIGS. 7A, 8B, and 8C. The latch disengagement member 84 includes a mobile finger grip portion 88 and the entry portion 42 defines a stationary grip surface 90 aligned with the mobile finger grip portion 88 (FIG. 5). An operator disengages the cot guide latch 82 from a cot guide positioned in the locking position 47 by moving the mobile finger grip portion 88 towards the stationary grip surface 90. The alignment of the stationary grip surface 90 and the mobile finger grip portion 88 enhances the ease at which disengagement of the cot guide latch 82 is achieved, see FIGS. 5 and 10.

The track securing members 48 extend from the lower track surface 58 and are designed so as to be securely received within the mounting assembly 16. Specifically, each securing member 48 comprises an extension portion 60, e.g., a substantially cylindrical shaft, secured to the frame 40 and a lateral projection 62, e.g., a member defining a substantially circular periphery, extending beyond a periphery of the extension portion 60, see FIGS. 7C, 7D, 8E, and 9.

Figures 6, 9:
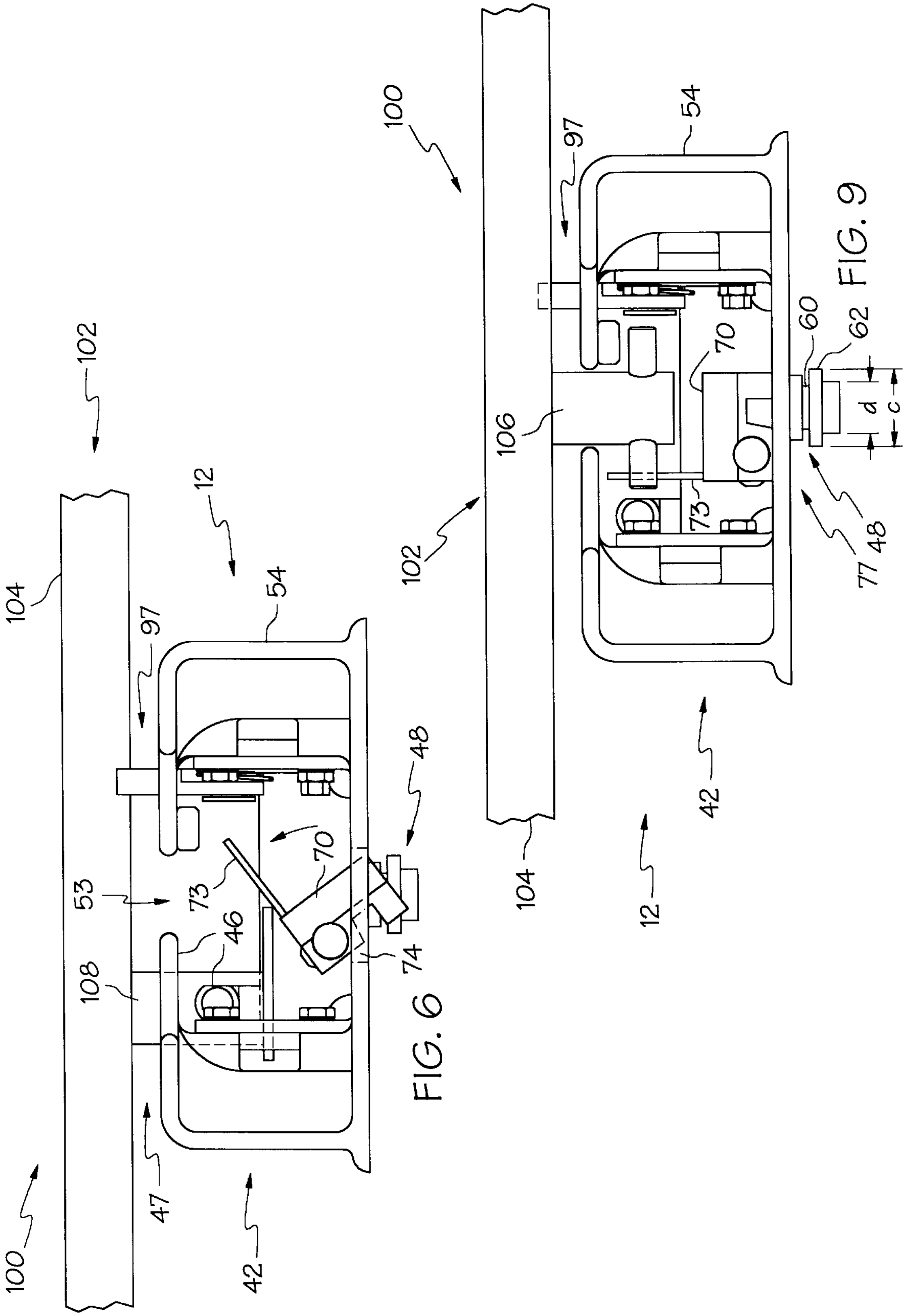
FIG. 6 is a plan view, partially broken away, of a cot fastening system according to the present invention.
FIG. 9 is a plan view, partially broken away, of a cot fastening system according to the present invention.

Referring now to FIG. 9 and to the mounting assemblies 16 illustrated in FIGS. 1, 2A, and 2B, the lateral projection 62 defines a projection dimension c which is greater than the lesser aperture dimension b and lesser than the greater aperture dimension a in mounting assemblies 16. Further, the extension portion 60 defines an extension dimension d which is less than the lesser aperture dimension b. Accordingly, the mounting assembly 16 is operative to securely receive each securing member 48 by permitting the extension portion 60 to pass along the entire length of the mounting path defined by the centering aperture 22 while securely receiving the extension portion 60 within the mounting cavity 20 adjacent the mounting lip 30.

The securing members 48 are clamped in place by passing a clamp 70 including a catch portion 72 through an upper clamping aperture 74 provided in the track 12 and the lower clamping aperture 36, see FIGS. 6, 7B, and 9. The clamp 70 is coupled to a rotatable shaft assembly 76. The catch portion 72 is aligned with the upper clamping aperture 74 and is offset a predetermined distance from an axis of rotation of the rotatable shaft assembly 76 such that the predetermined distance exceeds the distance from which the upper clamping aperture 74 is offset from the axis of be rotation. Accordingly, the catch portion 72 may be rotated so as to extend through the upper clamping aperture 74. Further, the catch portion 72 is sized such that, upon proper rotation of the catch portion 72, it is received within a clamping aperture recess 78 bounded by a clamping lip 80, see FIGS. 2A and 2B. It is contemplated by the present invention that other means may be provided for accomplishing the clamping function performed by the clamp 70.

A safety flag 73 is also coupled to the rotatable shaft assembly 76 so as to be rotatable with the clamp 70 between a secured position 75 and an unsecured position 77, see FIG. 7B. The unsecured position 77 is characterized by the interruption or blockage of the loading passage 53 by the safety flag 73. Accordingly, loading of an object intended to be mounted to or secured by the fastening track 12 is inhibited where the safety flag 73 is in the unsecured position 77 and the clamp 70 is not properly engaged within the clamping aperture recess 78. Conversely, the secured position 75 is characterized by non-intersection of the loading passage 53 by the safety flag 73 so as to permit loading when the safety flag 73 is in the secured position and the clamp 70 is properly engaged within the clamping aperture recess 78.

Specifically, referring now to FIGS. 3, 4A, 4B, 6 and 9, a cot fastening system 100 is illustrated comprising a fastening track 12 and a cot 102. The cot 102 comprises a chassis 104, a loading cot guide 106 secured to the chassis 104, and a trailing cot guide 108 secured to the chassis 104. As is illustrated in FIG. 9, the safety flag 73 is specifically arranged to inhibit passage of the loading cot guide 106 past the safety flag 73 when the safety flag 73 is in the unsecured position 77. Further, the safety flag 73 is specifically arranged to permit passage of the loading cot guide 106 past the safety flag 73 when the safety flag 73 is in the secured position 75, see FIG. 7B.

Referring now to FIG. 6, the locking mechanism 46 defines the locking position 47 such that, where the trailing cot guide 108 is positioned in the locking position 47, movement of the safety flag 73 to the unsecured position 77 is inhibited. In this manner, because the clamp 70 is coupled to the safety flag 73 through the rotatable shaft assembly 76, removal of the clamp 70 from the clamping aperture recess 78 is inhibited if a cot 102 is loaded within the fastening track 12. The trailing cot guide 108 includes a cut-out portion 109 for receiving the cot guide latch 82.

Referring now to FIGS. 5 and 8A, a stop cam 97 is provided to prevent inadvertent or improper unloading of an object from the fastening track 12. The stop cam 97 is positioned along the longitudinal body 54, preferably between the entry portion 42 and the second end 52. The stop cam 97 extends from the upper track surface 56 in an extended position and includes a camming surface 98 and a mechanical stop surface 99. The stop cam 97 is oriented such that the camming surface 98 is generally disposed in the direction of the first end 50 and such that the mechanical stop surface 99 is generally disposed in the direction of the second end 52, see FIG. 7D. The stop cam 97 is spring loaded so as to be movable under compression out of the extended position towards a retracted cam position, e.g. in response to abutment of the camming surface 98 by a structural portion of a cot moving in the direction of the second end 52.

Referring now to FIGS. 5 and 7D, a cot fastening system 100 is illustrated comprising the fastening track 12 and the cot 102.

The cot 102 includes a support member 110 specifically arranged to abut the camming surface 98 and move the stop cam 97 out of the extended position towards the retracted cam position as the loading cot guide 106 is passed through the loading passage 53 towards the second end 52 of the fastening track 12. Further, the support member 110 is arranged so as to abut the mechanical stop surface 99 of the stop cam 97 as the loading cot guide 106 is passed through the loading passage 53 towards the first end 50 of the fastening track 12.

To permit unloading of the cot 102, a stop cam release mechanism 112 is secured to the chassis 104. The release mechanism comprises a hand grip 116 mechanically coupled to a release lever 118. Activation of the hand grip 116, as indicated in FIG. 5, causes a release lever 118 coupled to the support member 110 to engage the stop cam 97 and move the stop cam 97 towards the retracted position out of the path of the support member 110.

Figure 3:
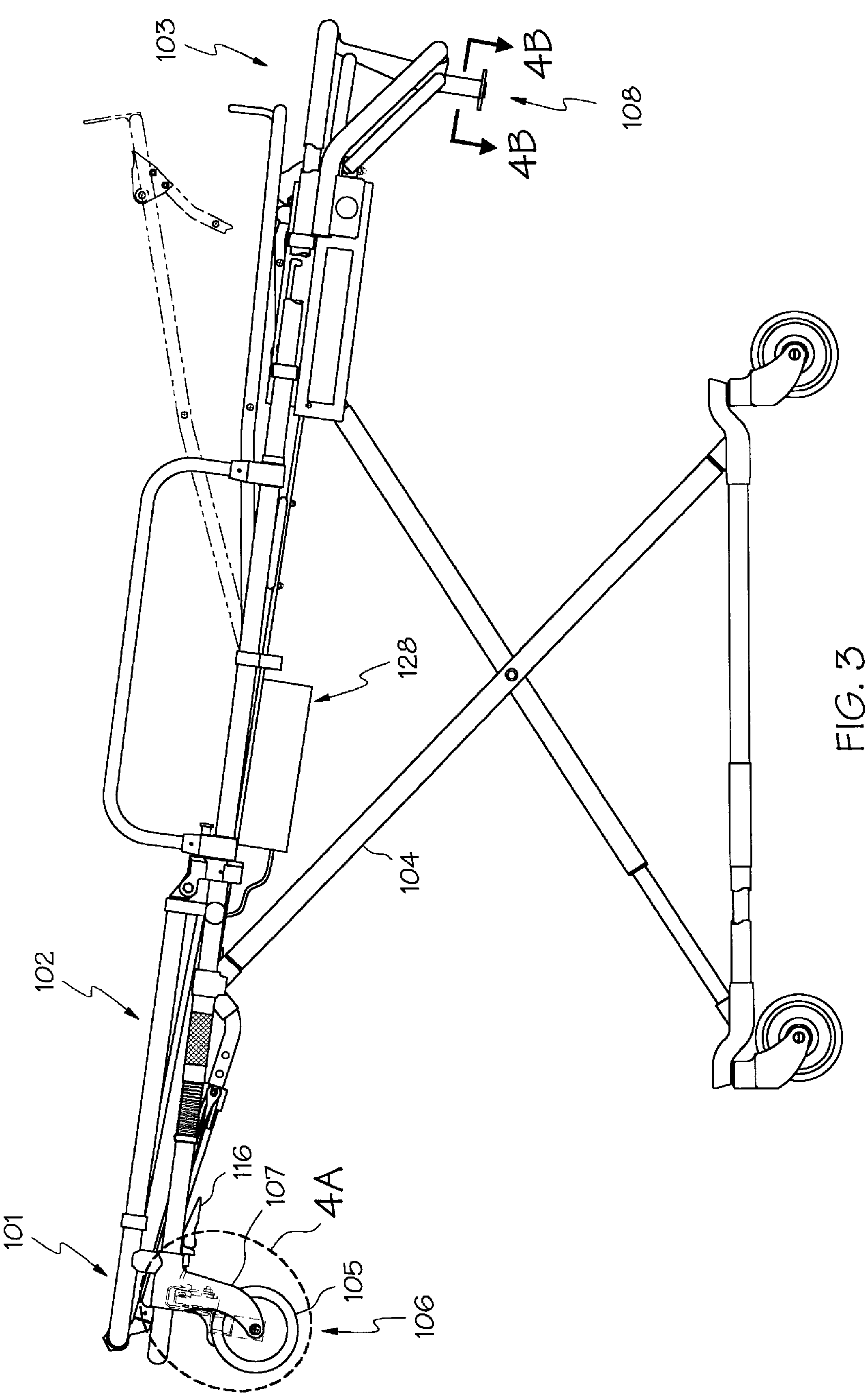
FIG. 3 is a plan view of a cot according to the present invention.
Figure 4B:
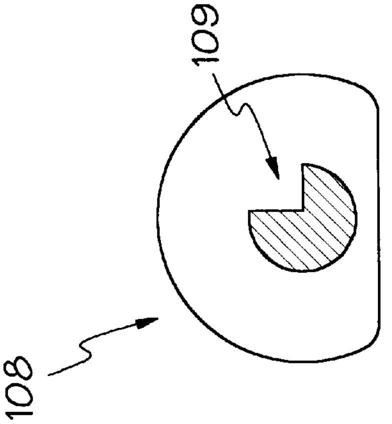
FIG. 4B is a plan view, partially in cross section, of the cot of FIG. 3, taken along line 4B—4B.
Figure 4A:
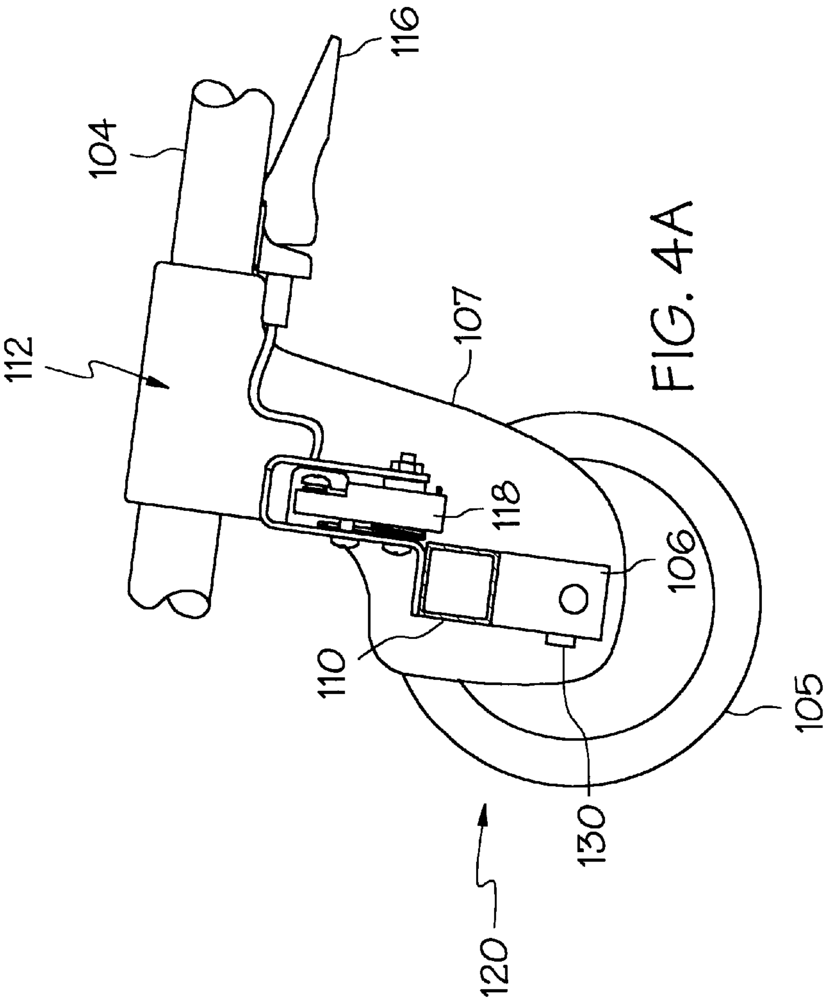
FIG. 4A is an enlarged plan view, partially in cross section and partially broken away, of the cot of FIG. 3, of the loading end of the cot identified as area 4A in FIG. 3.

Referring further to FIGS. 3 and 4A, the chassis 104 of cot 102 defines a loading end 101 and a trailing end 103 and includes loading wheels 105 supported by respective loading wheel hubs 107. The loading wheel hubs 107 are coupled to the loading end 101 of the chassis 104. The loading cot guide 106 is coupled to the support member 110. The support member 110 is mechanically coupled between the loading wheel hubs 107 such that the loading cot guide 106 is substantially aligned with an axis of rotation of the loading wheels 105. The trailing end 103 of the chassis 104 may be raised and lowered while the loading cot guide 106 is positioned within the loading passage 53 because the loading cot guide 106 is substantially aligned with the axis of rotation of the loading wheels 105. Accordingly, damage to the fastening track 12 and the cot 102 during loading is minimized.

Referring now to FIGS. 1 and 4A, a fastening track 12 and a cot fastening system 100 including a specially designed data connection 120 are illustrated. The data connection 120 is positioned along the longitudinal body 54 of the fastening track 12. The data connection 120 comprises a track-mounted data port 122 in a predetermined data port position relative to the longitudinal body 54 and a second data port 124 coupled to the track-mounted data port 122 via a data link 126.

The cot 102 includes a data transmission device 128 mounted thereto, e.g., a personal computer or a data link. The data transmission device 128 includes a cot-mounted data port 130, see FIG. 4A. The track-mounted data port 122 is positioned to enable transfer of data between the cot-mounted data port 130 and the track-mounted data port 122 subsequent to passage of a portion of the cot 102 through the cot entry portion 42 of the cot fastening track 12 or when the cot 102 is properly loaded on or secured to the fastening track 12. Specifically, the cot-mounted data port 130 and the track-mounted data port 122 comprise mating electrical data connections, optical data connections, or another type of data connection which allows convenient transfer of data.

Referring now to FIG. 5, a fastening track 12 including a specially designed lighting arrangement is illustrated. Respective arrays of indicator lights 132 are provided parallel to the entry portion 42 and parallel to the longitudinal body 54 along the upper track surface 56 to serve as a cot loading guide or as a guide indicating the general position of the fastening track 12. One of the arrays of indicator lights 132 preferably defines a converging path of illumination positioned along the entry portion 42. In this manner, a loading operator is directed towards the center of the entry portion 42.

A first subset of at least one indicator light 134 and a second subset of at least one indicator light 136 are coupled to a switching mechanism 138. The switching mechanism 138 is operative to selectively energize the first subset of indicator lights and the second subset of indicator lights in response to engagement of the locking mechanism 46 about a portion of a cot. Specifically, the first subset of lights 134 emit red light to indicate disengagement of the locking mechanism 46 and the second subset of lights 136 emit green light to indicate engagement of the locking mechanism 46. Further, as indicated above, at least one of the first subset of indicator lights 134 and the second subset of indicator lights 136 defines a converging path of illumination. In this manner, the indicator lights 134, 136 perform the dual function of guiding cot loading and indicating whether proper loading has been achieved.

Having described the invention in detail and by reference to preferred embodiments thereof, it will be apparent that modifications and variations are possible without departing from the scope of the invention defined in the appended claims.

What is claimed is:

1. A fastening track comprising:

a frame defining a first end, a second end, a longitudinal body extending from said first end to said second end, said longitudinal body defining an upper track surface and a lower track surface, wherein said frame comprises a shell defining a pair of longitudinal cavities positioned on opposite sides of said longitudinal body, and a spanner positioned within each of said pair of longitudinal cavities and extending substantially the entire length of said longitudinal cavity, said spanner being formed of a material which exhibits insignificant thermal expansion relative to said shell at temperatures ranging from about −40° F. to about 140° F. (about −40° C. to about 60° C.);

an entry portion positioned proximate said first end;

an abutment portion positioned along said longitudinal body between said entry portion and said second end;

a locking mechanism positioned along said longitudinal body; and at least two track securing members secured to said frame.

2. A fastening track as claimed in claim 1 wherein said locking mechanism is positioned along said longitudinal body between said entry portion and said abutment portion.

3. A fastening track as claimed in claim 1 wherein said securing members each comprise an extension portion comprising a substantially cylindrical shaft and an attached lateral projection defining a substantially circular periphery.

4. A fastening track comprising:

a frame defining a first end, a second end, a longitudinal body extending from said first end to said second end, said longitudinal body defining an upper track surface and a lower track surface;

an entry portion positioned proximate said first end;

an abutment portion positioned along said longitudinal body between said entry portion and said second end;

a track securing member secured to said frame; and a locking mechanism positioned along said longitudinal body, wherein said locking mechanism comprises a cot guide latch positioned to extend into a locking position, and a latch disengagement member coupled to said cot guide latch and positioned adjacent an exterior surface of said longitudinal body, said latch disengagement member includes a mobile finger grip portion, and said entry portion defines a stationary grip surface aligned with said mobile finger grip portion.

5. A fastening track comprising:

a frame defining a first end, a second end, a longitudinal body extending from said first end to said second end, said longitudinal body defining an upper track surface and a lower track surface;

an entry portion positioned proximate said first end;

an abutment portion positioned along said longitudinal body between said entry portion and said second end;

a locking mechanism positioned along said longitudinal body, wherein said locking mechanism comprises a cot guide latch positioned to extend into a locking position, and a latch disengagement member coupled to said cot guide latch and positioned adjacent an exterior surface of said longitudinal body;

a track securing member secured to said frame; and an intermediate abutment portion and at least one intermediate mounting plate positioned along said longitudinal body between said abutment portion and said entry portion, said intermediate mounting plate and said intermediate abutment portion defining an attachment assembly operative to mechanically couple said intermediate abutment portion to said intermediate mounting plate.

6. A fastening track comprising:

a frame defining a first end, a second end, a longitudinal body extending from said first end to said second end, said longitudinal body defining an upper track surface and a lower track surface;

an entry portion positioned proximate said first end;

an abutment portion positioned along said longitudinal body between said entry portion and said second end;

a locking mechanism positioned along said longitudinal body;

at least two track securing members secured to said frame; and a track clamping mechanism, wherein said track clamping mechanism comprises a safety flag movable between a secured position and an unsecured position; and a clamp coupled to said safety flag, wherein said longitudinal body defines a loading passage extending from said entry portion to said abutment portion and wherein said unsecured position is characterized by intersection of said loading passage by said safety flag, and wherein said secured position is characterized by non-intersection of said loading passage by said safety flag.

7. A fastening track comprising:

a frame defining a first end, a second end, a longitudinal body extending from said first end to said second end, said longitudinal body defining an upper track surface and a lower track surface;

an entry portion positioned proximate said first end;

an abutment portion positioned along said longitudinal body between said entry portion and said second end;

a locking mechanism positioned along said longitudinal body;

a track securing member secured to said frame; and a track clamping mechanism, wherein said track clamping mechanism comprises a safety flag movable between a secured position and an unsecured position, a clamp coupled to said safety flag, and an upper clamping aperture formed in said lower track surface, wherein said safety flag is coupled to a rotatable shaft assembly, and wherein said clamp is coupled to the rotatable shaft assembly, the clamp including a catch portion aligned with the upper clamping aperture and offset a predetermined distance from an axis of rotation of the rotatable shaft assembly such that the predetermined distance exceeds the distance from which the upper clamping aperture is offset from the axis of rotation.

8. A fastening track comprising:

a frame defining a first end, a second end, a longitudinal body extending from said first end to said second end, said longitudinal body defining an upper track surface and a lower track surface;

an entry portion positioned proximate said first end;

an abutment portion positioned along said longitudinal body between said entry portion and said second end;

a locking mechanism positioned along said longitudinal body;

a track securing member secured to said frame; and a stop cam positioned along said longitudinal body and extending from said upper track surface in an extended position, said stop cam including a camming surface and a mechanical stop surface, and said stop cam being oriented such that:

said camming surface is generally disposed in the direction of said first end, and said mechanical stop surface is generally disposed in the direction of said second end.

9. A fastening track as claimed in claim 8 wherein said stop cam is spring loaded so as to be movable under compression out of said extended position towards a retracted cam position.

10. A fastening track comprising:

a frame defining a first end, a second end, a longitudinal body extending from said first end to said second end, said longitudinal body defining an upper track surface and a lower track surface;

an entry portion positioned proximate said first end;

an abutment portion positioned along said longitudinal body between said entry portion and said second end;

a locking mechanism positioned along said longitudinal body;

a track securing member secured to said frame; and an electronic data connection positioned along said longitudinal body.

11. A fastening track comprising:

a frame defining a first end, a second end, a longitudinal body extending from said first end to said second end, said longitudinal body defining an upper track surface and a lower track surface;

an entry portion positioned proximate said first end;

an abutment portion positioned along said longitudinal body between said entry portion and said second end;

a locking mechanism positioned along said longitudinal body;

a track securing member secured to said frame; and an electronic data connection positioned along said longitudinal body, wherein said data connection comprises a track-mounted data port in a predetermined data port position relative to said longitudinal body and a second data port coupled to said track-mounted data port via a data link.

12. A fastening track comprising:

a frame defining a first end, a second end, a longitudinal body extending from said first end to said second end, said longitudinal body defining an upper track surface and a lower track surface;

an entry portion positioned proximate said first end;

an abutment portion positioned along said longitudinal body between said entry portion and said second end;

a locking mechanism positioned along said longitudinal body;

a track securing member secured to said frame; and an array of indicator lights oriented substantially parallel to one of said longitudinal body and said entry portion.

13. A fastening track as claimed in claim 12 wherein said array of indicator lights is positioned along said upper track surface.

14. A fastening track as claimed in claim 13 wherein said entry portion defines a converging entry path and wherein said array of indicator lights defines a converging path of illumination positioned along said entry portion.

15. A fastening track comprising:

a frame defining a first end, a second end, a longitudinal body extending from said first end to said second end, said longitudinal body defining an upper track surface and a lower track surface;

an entry portion positioned proximate said first end;

an abutment portion positioned along said longitudinal body between said entry portion and said second end;

a locking mechanism positioned along said longitudinal body;

a track securing member secured to said frame; and a first subset of at least one indicator light and a second subset of at least one indicator light; and a switching mechanism arranged so as to selectively energize said first subset of indicator lights and said second subset of indicator lights in response to engagement of said locking mechanism.

16. A fastening track as claimed in claim 15 wherein at least one of said first subset of indicator lights and said second subset of indicator lights defines a converging path of illumination.

17. A fastening track as claimed in claim 16 wherein said entry portion defines a converging entry path and wherein at least one of said first subset of lights and said second subset of lights define a converging path of illumination positioned along said entry portion.

18. A fastening track as claimed in claim 17 wherein said first subset of lights indicate disengagement of said locking mechanism and said second subset of lights indicate engagement of said locking mechanism.

* * * * *